(12) United States Patent
Jaeger

(10) Patent No.: US 9,339,913 B2
(45) Date of Patent: May 17, 2016

(54) TOOL SPINDLE FOR A HONING MACHINE WITH A BOWL-SHAPED HOLDER FOR A HONING RING

(71) Applicant: FELSOMAT GmbH & Co. KG, Koenigsbach-Stein (DE)

(72) Inventor: Helmut F. Jaeger, Koenigsbach-Stein (DE)

(73) Assignee: Felsomat GmbH & Co. KG., Koenigsbach-Stein (DE)

( * ) Notice: Subject to any disclaimer, the term of this patent is extended or adjusted under 35 U.S.C. 154(b) by 188 days.

(21) Appl. No.: 14/214,781

(22) Filed: Mar. 15, 2014

(65) Prior Publication Data

US 2014/0199925 A1 Jul. 17, 2014

Related U.S. Application Data

(63) Continuation of application No. PCT/EP2012/067956, filed on Sep. 13, 2012.

(30) Foreign Application Priority Data

Sep. 16, 2011 (DE) .......................... 10 2011 082 867

(51) Int. Cl.
*B24B 33/10* (2006.01)
*B24B 33/08* (2006.01)
(Continued)

(52) U.S. Cl.
CPC ............... *B24B 33/105* (2013.01); *B23F 19/05* (2013.01); *B23F 19/057* (2013.01); *B23F 23/1281* (2013.01); *B24B 33/04* (2013.01); *B24B 33/08* (2013.01); *B24B 33/081* (2013.01)

(58) Field of Classification Search
CPC ............ B23F 1/02; B23F 1/023; B23F 1/026; B23F 19/045; B23F 19/057; B24B 5/04; B24B 5/047; B24B 33/04; B24B 33/081; B24B 33/105; B24B 41/061
See application file for complete search history.

(56) References Cited

U.S. PATENT DOCUMENTS 5,341,603 A * 8/1994 Pollock ................... B24B 5/423
451/180
5,347,760 A * 9/1994 Miyauch ............. B23F 23/1231
451/114

(Continued)

FOREIGN PATENT DOCUMENTS

| CH | 686937 A5 | 8/1996 |
|---|---|---|
| CN | 1868651 A | 11/2006 |

(Continued)

OTHER PUBLICATIONS

DVS Gruppe, "Eine Grupe stellt sich vor . . . ", XP-002693905, Dec. 31, 2006, pp. 1-28, Munich, Germany.

(Continued)

*Primary Examiner* — Timothy V Eley
(74) *Attorney, Agent, or Firm* — Hackler Daghighian & Martino

(57) ABSTRACT

A tool spindle for a honing machine includes a bowl-shaped holder having a circumferential peripheral wall connected to a bottom part. The bowl-shaped holder is configured to hold a honing ring on an inside of the bowl-shaped holder. At least one expansion element is formed on the inside of the bowl-shaped holder along an inner surface of the circumferential peripheral wall. The at least one expansion element radially clamps and centers the honing ring inside the bowl-shaped holder. A hydraulic chamber is disposed in the bottom part of the bowl-shaped holder. At least one hydraulic line is connecting in fluid communication the at least one expansion element and the hydraulic chamber. A single adjustment element is movable in relation to the bottom part of the bowl-shaped holder, where the single adjustment element is in fluid communication with the hydraulic chamber.

20 Claims, 4 Drawing Sheets

(51) Int. Cl.
*B24B 33/04* (2006.01)
*B23F 19/05* (2006.01)
*B23F 23/12* (2006.01)

(56) References Cited

U.S. PATENT DOCUMENTS

| | | | |
|---|---|---|---|
| 6,958,000 B2 * | 10/2005 | Yoshioka | B23F 23/1281 409/55 |
| 7,172,495 B2 * | 2/2007 | Kobialka | B23F 23/1218 451/21 |
| 8,235,771 B2 * | 8/2012 | Bankovic | B23F 19/057 409/9 |
| 2003/0207657 A1 * | 11/2003 | Domanski | B24B 33/081 451/482 |
| 2006/0264155 A1 | 11/2006 | Kobialka | |
| 2014/0199924 A1 * | 7/2014 | Jaeger | B23F 19/057 451/253 |

FOREIGN PATENT DOCUMENTS

| | | |
|---|---|---|
| DE | 2719524 A1 | 12/1977 |
| DE | 9414682 U1 | 11/1994 |
| DE | 19724527 A1 | 12/1998 |
| EP | 1 724 046 A1 | 11/2006 |

OTHER PUBLICATIONS

Prawema Honing, SynchroFine 205 HS, pp. 1-12.

* cited by examiner

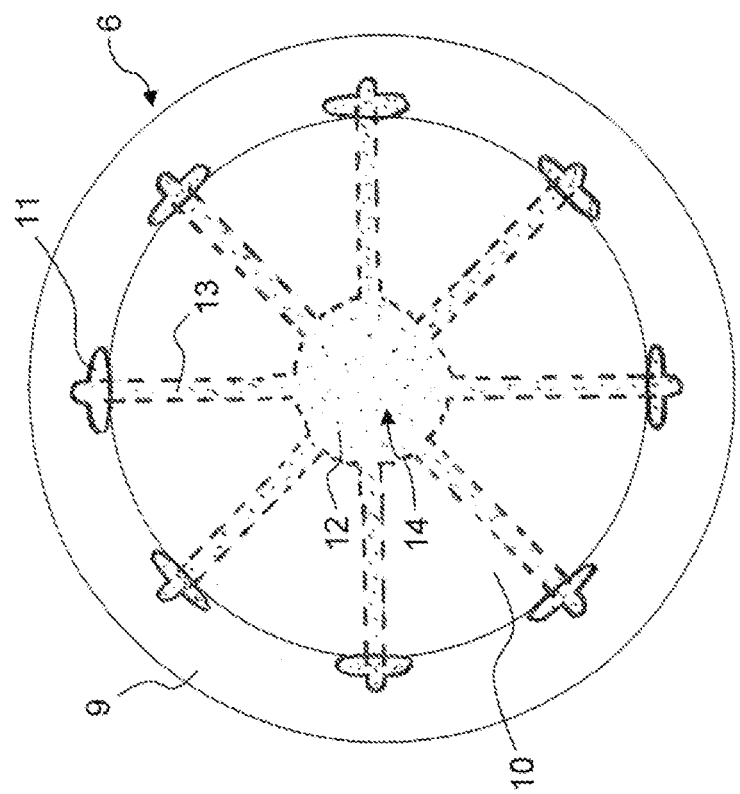
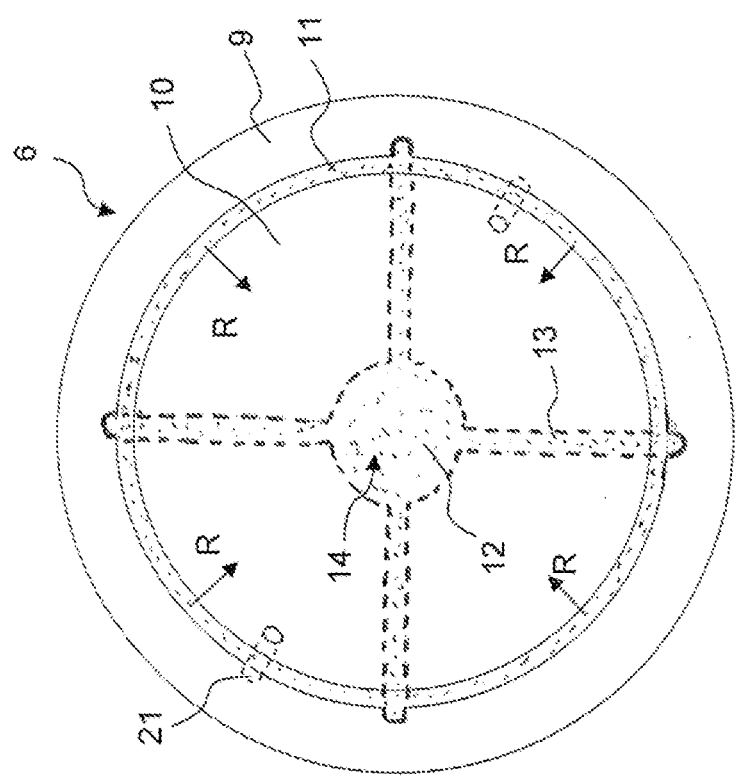

TOOL SPINDLE FOR A HONING MACHINE WITH A BOWL-SHAPED HOLDER FOR A HONING RING

CROSS-REFERENCE TO RELATED APPLICATIONS

This continuation application claims priority to PCT/EP2012/067956 filed on Sep. 13, 2012 which has published as WO 2013/037891 A2 and also the German application number 10 2011 082 867.2 filed on Sep. 16, 2011, the contents of which are fully incorporated herein with these references.

FIELD OF THE INVENTION

The present invention concerns a tool spindle for a honing machine, comprising a motor-driven holder for a honing ring, wherein the holder comprises at least one hydraulic expansion element, by means of which the honing ring can be radially clamped and centered in the holder.

BACKGROUND OF THE INVENTION

A tool spindle of this type for a honing machine has become known, for example, through the company publication "SynchroFine 205 HS" by PRÄWEMA Antriebstechnik GmbH, Eschwege/Werra, Germany.

In honing where a toothed workpiece such as a gear wheel or a gear is involved, the tooth flanks are passed in a so-called honing ring which is made usually of a ceramic material or is coated with a ceramic material. Material is removed thereby from the tooth flanks of the workpiece. The honing ring is basically annular in shape and comprises, for its part, radially inwardly directed tooth flanks.

As the workpiece and honing ring are being passed back and forth, the honing ring is rotated by means of a tool spindle. Likewise, the workpiece is rotated by means of a workpiece spindle. In this, the workpiece spindle rotates at speeds up to the order of 10,000 rpm. Since, in honing, the excess material removed is only in the order of 15-50 μm, the honing ring and the workpiece have to be aligned and synchronized very precisely with each other. Accordingly, the honing ring must be held firmly and positioned accurately in the tool spindle.

In the prior art, a hydraulically-centering system is used for this. In order to hold the honing ring for the processing operation, hydraulic expansion elements for the honing ring are clamped in the radial direction as a hydraulic medium (usually a hydraulic oil) is forced into the expansion elements. The expansion elements prevent the honing ring from moving radially.

In the prior art, such as in the "SynchroFine 205 HS" mentioned above, the pressure in the hydraulic system is applied by a plurality of screws. In a tool change (exchange of honing ring), possibly the result of wear or a changeover to another type of workpiece, these screws must all be loosened and re-tightened, making the tool change quite time-consuming.

The object of the invention is to provide a tool spindle for a honing machine whereby a tool change can be done faster and more easily. The present invention fulfills these needs and provides other related advantages.

SUMMARY OF THE INVENTION

The object of the present invention is resolved by a tool spindle of the type mentioned at the beginning, which is characterised in that the holder is bowl-shaped with a peripheral wall part and a bottom part terminating the wall part at a side. At least one expansion element is formed inside on the peripheral wall part. All expansion elements are connected to a hydraulic chamber, which is arranged in the bottom part. Only a single adjustment element is needed, whereby the pressure of a hydraulic medium in the hydraulic chamber is adjustable and thus in all the expansion elements.

In the case of the tool spindle according to the invention, a hydraulic system is incorporated in essential parts in a bottom part of the holder. In the bottom part, a typically central hydraulic chamber is provided by means of which the one or (as a rule) a plurality of hydraulic lines, which supply hydraulic medium to the at least one expansion element, can, at the same time, be pressurized or relieved of pressure. The size of the hydraulic chamber is not limited by the wall thickness of the peripheral wall part of the holder so that, with a single adjustment element, just one hydraulic pressure can be set for all expansion elements or, respectively, the entire inner circumference of the holder and which is sufficient for securing the honing ring during the honing operation. The single adjustment element which is generally arranged on the inner side or the outer side of the bottom part (but it can be incorporated inside the bottom part also) can be operated easily and quickly in order to increase or decrease the hydraulic pressure quickly in a tool change.

The adjustment element is typically centrally arranged (i.e. on the axis of rotation of the holder through which the center of the honing ring runs). By arranging the hydraulic chamber and/or adjustment element centrally, pressure differences between potentially differing hydraulic lines and expansion elements or partial regions of a hydraulic expansion element are avoided. Typically, the adjustment element (possibly with a movable plunger face) changes the volume available for the hydraulic medium in the hydraulic chamber.

The bottom part may be continuously formed (hole-free), in which case the bottom part may also be used for collecting oil, which is used in the honing process for cooling and for removal of swarf and abrasion products. Alternatively (and preferably) the bottom part has openings (holes) to drain oil or to save weight. The bottom part stabilizes the holder mechanically also so that imbalances can be avoided better.

The scope of the invention allows for the provision of one or more hydraulic expansion elements in the holder, and preferably each expansion element is provided with at least one hydraulic line which connects the expansion element directly with the hydraulic chamber. A hydraulic line of this type runs, as a rule, partly in the peripheral wall part and partly in the bottom part.

In an advantageous embodiment of the tool spindle according to the invention, it is provided that the holder comprises only one hydraulic expansion element, that the one hydraulic expansion element is formed circumferentially, and that a plurality of hydraulic lines are provided, which connect the one expansion element with the hydraulic chamber. This structure enables the particularly accurate centering of the honing ring in the holder, in particular the hydraulic lines are distributed evenly. As an alternative to this embodiment, even more hydraulic expansion elements, preferably evenly distributed along the (inner) perimeter of the wall part, are possible. In the case of several expansion elements, typically at least and preferably exactly one hydraulic line to the hydraulic chamber is provided for each expansion element. The hydraulic lines are typically arranged in a star-shape (in all embodiments), and uniformly distributed along the circumference of the holder.

A particularly preferred embodiment is one in which the adjustment element is designed as an adjusting screw. An adjusting screw is particularly easy for a worker to use and allows high pressures to be set with comparatively little effort when adjusting the screw. If desired, an adjusting screw can be easily secured with a lock nut to prevent accidental adjustment.

An advantageous further development of this embodiment provides that the adjusting screw is located inside on the bottom part. The inner side is usually easily accessible (with retracted workpiece spindle), leaving space on the underside of the bottom part for, for example, a motor for the tool spindle. Note that, within the scope of the present invention, it is possible in principle to arrange any type of adjustment element in an advantageous manner on the internal side of the bottom part.

In another embodiment, the adjustment element is formed as a movable slider. Sliders can be operated particularly easily by means of an external operating mechanism. In the simplest case, the slider is arranged centrally, such as outside on the bottom part and, even while the holder is rotating, it can be held, either manually or motor-driven ("by push-button"), in a position to lock the honing ring by the operating mechanism, which does not rotate with the holder, possibly by a mandrel entering into the bottom part.

In an advantageous further development of this embodiment, the holder comprises a preloading means whereby the slider is preloaded into a position in which a honing ring is clamped and centered. In this case, the slider does not need to be held during the honing operation by an external operating mechanism. A spring in particular can be used as the preloading means. The preloading of the slider can be released manually or motor-driven ("by push-button") for a changeover or exchange of the honing ring. An external operating mechanism, in particular, which does not rotate with the holder, may be used for this.

In another advantageous embodiment, the holder has a locking mechanism, by means of which the slider is self-locking in one or several positions to clamp and center the honing ring. Also, in this case the slider does not need to be held during the honing operation by an external operating mechanism. The locking can then be disengaged from the outside manually or by a motor ("by push-button") for a changeover or exchange of the honing ring. An external operating mechanism, in particular, which does not rotate with the holder, may be used for this.

An embodiment in which a motorized drive for the holder is provided on the outer side on the bottom part of the holder is particularly advantageous. By arranging the drive in the region of the bottom part, the construction of the tool spindle can be kept compact in the radial direction, in particular smaller than in the case of a motor arrangement located radially outward adjacent to the wall part.

Continuing from this, a preferred further development of this embodiment provides that the holder has a central shaft on the bottom part on the outer side or is connected rigidly to a shaft, and that the holder is mounted on the shaft and motor-driven by the shaft. This construction has proven itself in practice and is particularly stable.

A honing machine comprising at least one workpiece spindle and one tool spindle according to the invention described above also falls within the scope of the present invention. The honing ring (the tool) can then be changed very easily and quickly. Typically the tool spindle is orientated vertically and typically the tool spindle can be displaced by a motor and with its spindle axis is aligned vertically. Alternatively, other orientations of the tool spindle and the workpiece spindle are possible, such as horizontally.

An advantageous embodiment of the honing machine according to the invention provides that the honing machine has a machine housing in which the workpiece spindle and the tool spindle are arranged, and that a settling tank is arranged in the machine housing which surrounds the tool spindle preventing the escape of oil. As a result, contamination of the interior of the machine housing is prevented. The settling tank may be funnel-shaped in particular.

A preferred further development of this embodiment provides that the settling tank has a screen with a cut-out, by means of which the workpiece spindle with a spindle head can be inserted through the cut-out into the settling tank, so that a spindle collar on the workpiece spindle provides an oil-tight seal for the cut-out. The screen is mounted displaceably and oil-tight on the settling tank so that the screen is moved relative to the tool spindle as the workpiece spindle performs a feed movement. This design has proved itself in practice and provides the settling tank with a very good seal.

Further advantages of the invention will become apparent from the description and the drawing. Similarly, the above-mentioned and the still further detailed features according to the invention can each be applied individually in themselves or collectively in optional combinations. The illustrated and described embodiments are not to be taken as an exhaustive list but rather by way of examples for describing the invention.

BRIEF DESCRIPTION OF THE DRAWINGS

The invention is illustrated in the drawing and is described with reference to examples of embodiments. The drawings show:

FIG. 2 is a schematic horizontal cross-section through the holder of the tool spindle of FIG. 1 level with the single expansion element;

FIG. 3 is a schematic horizontal cross-section through a holder of a tool spindle similar to that of FIG. 1, level with the plurality of expansion elements;

DETAILED DESCRIPTION OF THE PREFERRED EMBODIMENTS

Figure 1:
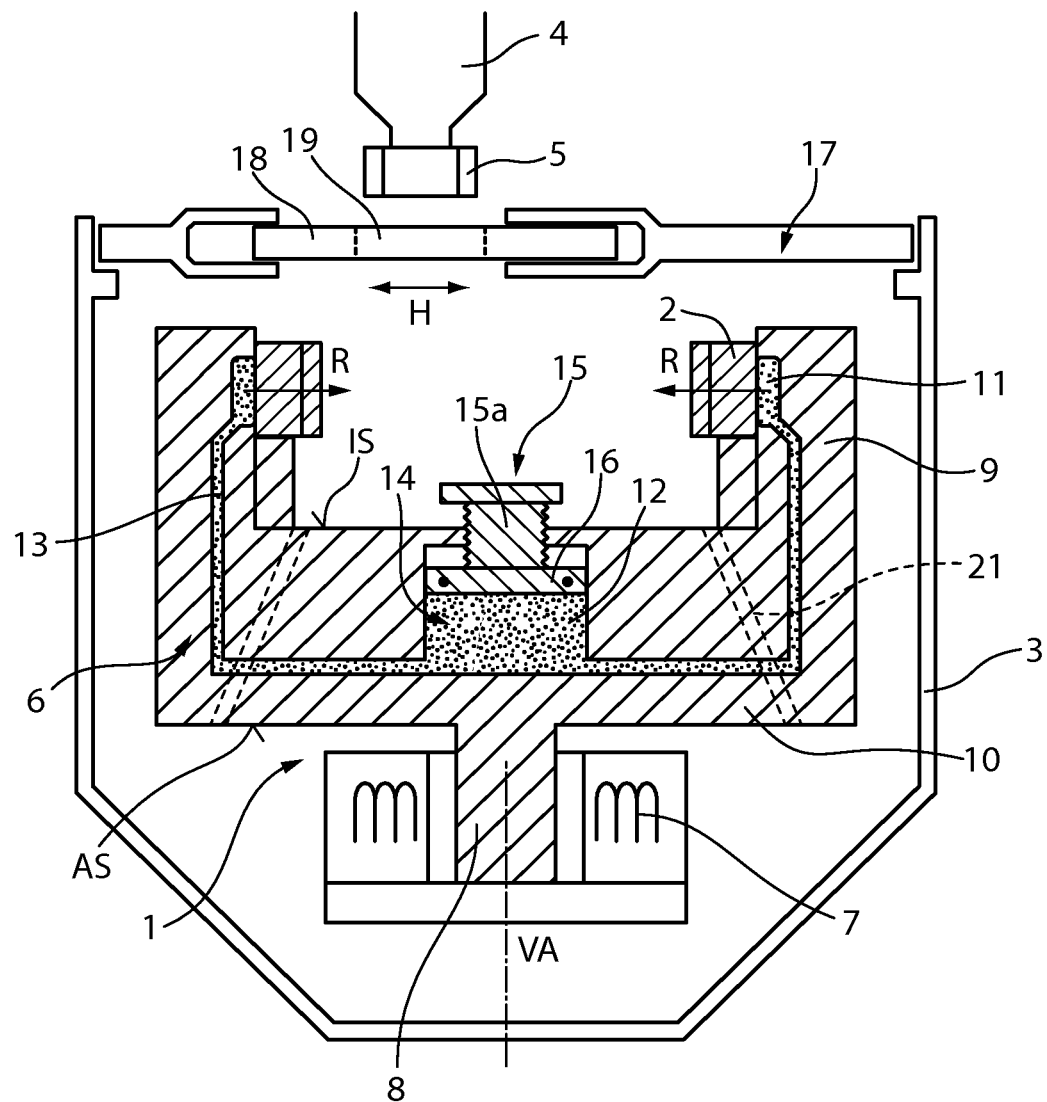
FIG. 1 is a schematic vertical cross section through an embodiment of a tool spindle according to the invention, arranged in an oil-tight settling tank.

FIG. 1 shows an example of a vertical section through an embodiment of a tool spindle 1 according to the invention. A tool, namely a honing ring 2, is held in the tool spindle 1. The tool spindle 1 is arranged in a settling tank 3 which protects the surroundings of the workpiece spindle 1 from oil contamination. In the situation illustrated, a workpiece spindle 4 feeds just one workpiece, in this case a gear wheel, held on spindle head 5, so that it can undergo a honing operation, the workpiece spindle 4 still remaining outside the settling tank 3.

The tool spindle 1 comprises a holder 6 in which the honing ring 2 is retained, a shaft 8, and an electric motor 7 whereby the shaft 8 and thus also the holder 6 can be driven. The honing ring 2 then rotates correspondingly around a vertical axis VA. Here, the holder 6 is mounted entirely above shaft 8.

The holder 6 is constructed in the shape of a bowl and comprises a peripheral wall part 9 and a bottom part 10. Refer also to the horizontal cross section through holder 6 of FIG. 2, which uses dashed lines to show some details also outside the section plane (which runs through the expansion element 11). A circumferential expansion element 11 is formed on the inside of the wall part 9. The expansion element 11 extends radially inward (see direction of arrow R) as the pressure of a hydraulic medium (hydraulic fluid) 12 (shown dotted) increases and can thereby clamp the honing ring 2. Conversely, as the pressure of the hydraulic fluid 12 decreases, the honing ring 2 is released. The expansion member 11 is formed in the illustrated embodiment substantially as an annular sleeve. Hydraulic lines 13 lead into the expansion element 11 at four points on it. The four hydraulic lines 13 are connected to a hydraulic chamber 14 which is formed (in a radial sense) centrally in the bottom part 10. The hydraulic lines 13 run out in the shape of a star from the hydraulic chamber 14 through the bottom part 10 and then up into the wall part 9. In this case, the hydraulic lines 13 are distributed symmetrically around the hydraulic chamber 14 (here, where there are four hydraulic lines 13 with an angular displacement of 360°/4=90°) and are similarly constructed, in particular of equal lengths.

The pressure of the hydraulic medium 12 in the hydraulic chamber 14, and hence in the entire hydraulic system (comprising the expansion element 11, the hydraulic lines 13 and the hydraulic chamber 14), can be adjusted by means of an adjustment element 15, which is designed here as an adjusting screw ("hydro expanding screw") 15*a*. In order to increase the pressure in the hydraulic chamber 14, the adjusting screw 15*a* can be screwed further into the bottom part 10. A plunger 16 connected to the adjusting screw 15*a* then moves further into the hydraulic chamber 14, and in doing so acts to compress the hydraulic fluid 12, i.e. to expel it out of the hydraulic chamber 14 (into the expansion element 11). In order to lower the pressure in the hydraulic chamber 14, the adjusting screw 15*a* may be rotated out of the bottom part 10. The plunger 16 then acts to expand the hydraulic medium 12, i.e. to draw it into the hydraulic chamber 14.

By using the plunger 16, amounts of the hydraulic medium, which expand (or contract) the expansion element 11 significantly, can be forced out of the hydraulic chamber 14 (or drawn into it), so that the single adjustment element 15 is sufficient to clamp and release the honing ring 2. In principle the entire bottom part 10 is available for forming the hydraulic chamber 14 and the adjustment element 15, so that they can be dimensioned to be of sufficient size. In particular, the radial extension of the holder 6 or, respectively, the tool spindle 1, is not affected. The adjusting screw 15*a* is accessible from the inside IS of the bottom part and therefore easily accessible from above by a worker through the honing ring 2.

The tool spindle 1 is arranged in the settling tank 3, which is approximately funnel-shaped. The holder 6 is arranged in its upper, wide portion, and the electric motor 7 is located in the lower, tapering region near the outside (underside) AS of the bottom part 10. With this arrangement, the electric motor 7 does not affect the radial extension of the tool spindle 1.

The settling tank 3 has a cover 17, which can be removed to change the honing ring 2. A screen 18 is mounted horizontally in the cover 17 to permit movement (see direction of arrow H). The screen 18 has a cut-out (opening) 19, whose diameter corresponds to the diameter of the spindle neck of the workpiece spindle 4 so that the cut-out 19 is completely closed by the workpiece spindle 4 inserted through the cut-out 19. Then the entire settling tank 3 is enclosed and oil-tight, so that oil that is sprayed in the honing process on the contact area of honing ring 2 and workpiece 5 cannot enter the surroundings, but remains in the settling tank 3. Horizontal feed movements of the workpiece spindle 4 thereby cause the screen 18 to move with it, whereby the leak-tightness of the working tank 3 is not impaired however.

In the bottom part 10 in the embodiment illustrated in FIG. 1 and FIG. 2, two drainage channels 21 are provided through which oil from the holder 6 drain down into the settling tank 3. Typically an oil drain (not shown) is provided at the bottom of the settling tank 3.

FIG. 3 illustrates an alternative design of a hydraulic system of a holder 6 of a tool spindle according to the invention similar to that shown in FIG. 1 and FIG. 2, now only the essential differences will be explained. The sectional view of FIG. 3 corresponds to the sectional view of FIG. 2.

In this hydraulic system, a plurality of eight expansion elements 11 are provided in this case, which are each connected to the central hydraulic chamber 14 via a hydraulic line 13. Since all expansion elements 11 experience the same pressure of the hydraulic medium 12, a honing ring can be centered extremely precisely. The pressurization is carried out as shown in FIG. 1 using a single adjustment element which acts on the hydraulic chamber 14.

Figure 4:
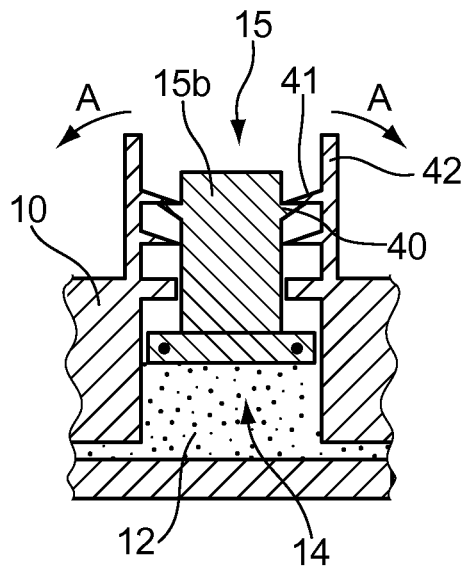
FIG. 4 is a schematic vertical cross section through a tool spindle similar to that of FIG. 1, in the region of adjustment element and the hydraulic chamber, with a self-locking slider.

FIG. 4 illustrates an alternative embodiment of an adjustment element 15, such as can be used also in the tool spindle of FIG. 1. The main differences only will be explained. The adjustment element 15 in this case is formed as a slider 15*b*, which can be inserted into the hydraulic chamber 14 or withdrawn out of it, to adjust the pressure in the hydraulic medium 12. If the slider 15*b* is pressed down in FIG. 4 into the hydraulic chamber 14, slider detents 40 of slider 15*b* snap in behind the retaining projections 41, which are formed on locking stanchions 42. The locking stanchions 42 are fixed to the bottom part 10 and can be bent elastically outwards (see direction of the arrow A). This occurs automatically due to a wedge effect as the slider 15*b* is pushed in.

In the latched condition with the slider detents 40 behind the retaining projections 41, the slider 15*b* cannot be withdrawn from the hydraulic chamber 14. Thus, a pressurized condition, which has been achieved by pushing the slider 15*b* in sufficiently far, is preserved automatically ("self-locking"). The entire system comprising the slider detents 40, retaining projections 41 and locking stanchions 42 may be referred to as a locking mechanism. The slider 15*b* can be withdrawn only when the locking stanchions 42 are bent outwards (such as manually), and the pressure in the hydraulic chamber 14 decreases.

Note that two levels of retaining projections 41 are provided in the illustrated embodiment, so that two different levels of pressure can be set thereby.

Figure 5:
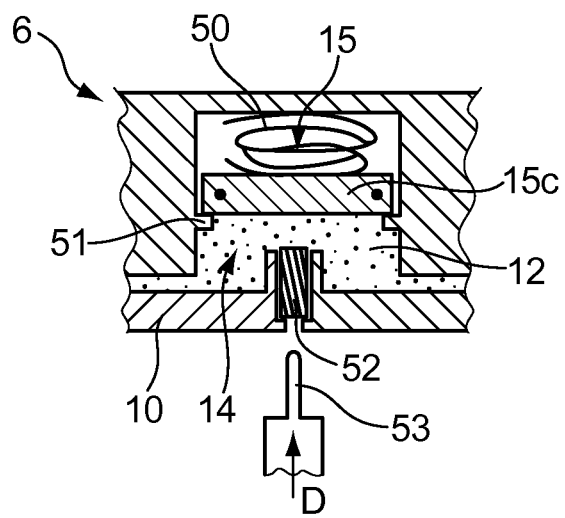
FIG. 5 is a schematic vertical cross section through a tool spindle similar to that of FIG. 1, in the region of adjustment element and the hydraulic chamber, with a spring-loaded slider.

FIG. 5 illustrates a further alternative embodiment of an adjustment element 15, such as can be used also in the tool spindle of FIG. 1; the main differences only will be explained.

Again, the adjustment element 15 here is formed as a slider 15*c* which is substantially integrated into the base member 10. The slider 15*c* is preloaded by means of a compression spring 50 in a position to create a high pressure of the hydraulic medium 12 in the hydraulic chamber 14 (corresponding to a clamped honing ring). The precise position is determined in this case by fixed stops 51 (alternatively the fixed stops 51 can be omitted also, so that the position of the slider arises for a high pressure from the equilibrium between the compression spring 50 and the elasticity of the expansion element(s); by omitting fixed stops, it is easier to offset any possible leakage of hydraulic fluid 12).

The slider 15c is pressed upward by means of an auxiliary plunger 52 against the spring force, thereby reducing the pressure in the hydraulic medium 12. The auxiliary plunger 52 can be pushed upward by means of a mandrel 53 which is pushed from below into the bottom part 10 in the direction of arrow D. The mandrel 53 in this case is motor-driven by an operating mechanism not shown in detail which does not rotate with the holder 6.

Note that the auxiliary plunger 52 should have a small diameter so as not to increase the pressure in the hydraulic chamber 14 unnecessarily at the beginning of the insertion of the auxiliary plunger 52.

Figure 6:
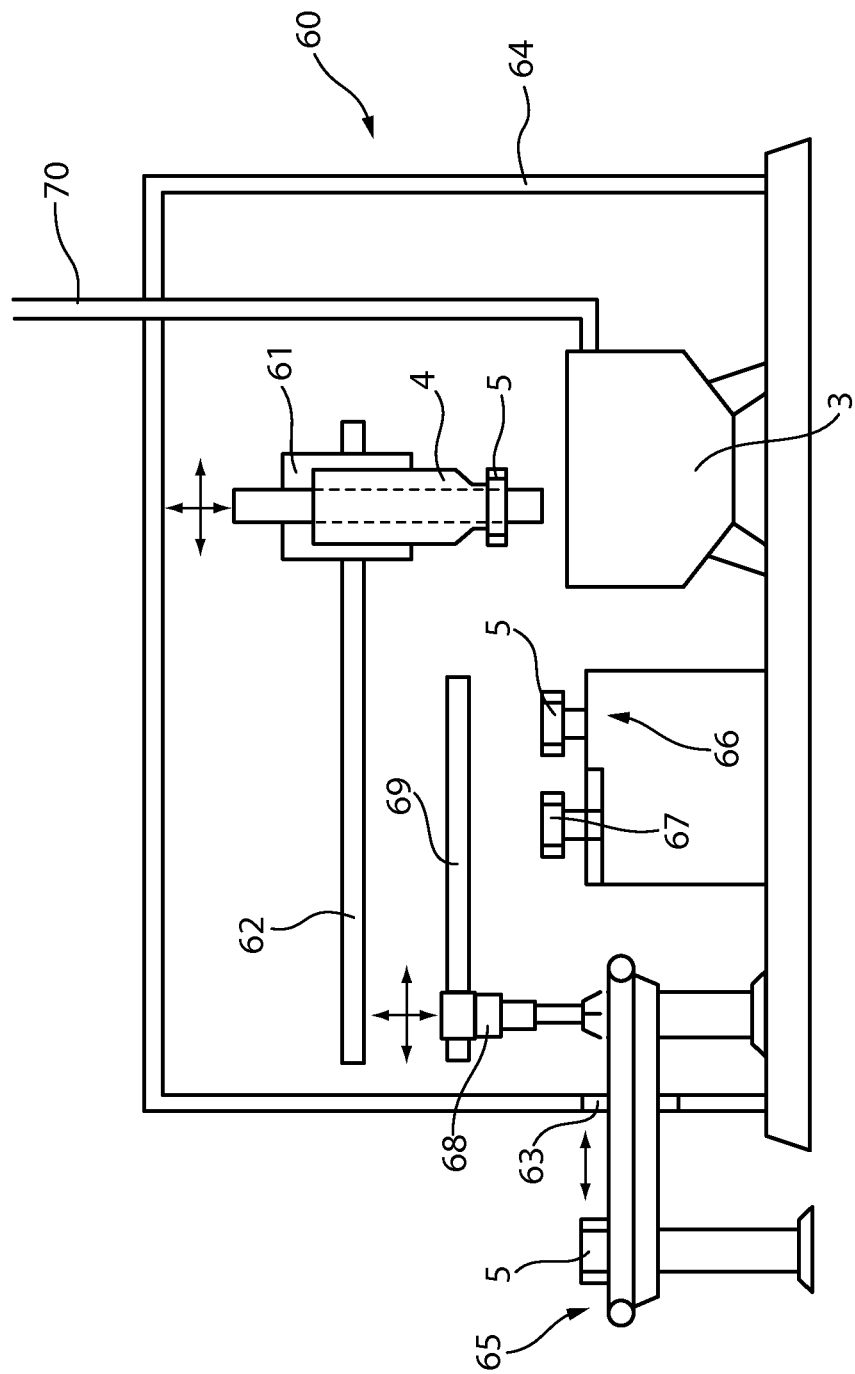
FIG. 6 is a schematic side view of an embodiment of a honing machine according to the invention.

In FIG. 6 a side view of an embodiment of a honing machine 60 according to the invention is presented by way of example. The honing machine 60 has a tool spindle which is arranged in a settling tank 3 (such as shown in FIG. 1) and a workpiece spindle 4 which is horizontally and vertically movable by means of a cross slide 61 and a portal system 62. The workpiece spindle 4 is designed in such a way that it is not just for turning a workpiece 5 for the honing process, but also for grasping it and placing it in the pick-up process. The honing machine 60 is arranged in a substantially closed machine housing 64.

The honing machine 60 comprises a conveyor system 65 along which individual workpieces 5 can be carried through an opening 63 into the machine housing 64 to the honing machine 60 and ejected.

A workpiece 5 can be carried by the conveyor system 65 to a test station 66 and measured by rolling on a master gear (freewheel) 67. A gripper 68 is used to carry the workpiece 5 in which the gripper is telescopic in a vertical direction and can be moved horizontally by means of a portal system 69. Workpieces 5 considered as not suitable in the inspection operation for further processing are returned by the gripper to the conveyor system 68 and ejected.

Those workpieces 5 suitable for honing are grasped at the test station 66 by the workpiece spindle 4 in the pick-up process and carried to the tool spindle in the settling tank 3. After completion of the honing operation on the tool spindle or, respectively, on the honing wheel there, the workpiece 5 is carried by the workpiece spindle 4 back to the conveyor belt system 65 and ejected.

In this system, the settling tank 3 prevents the ingress of oil into the interior of the machine housing 64, the oil being needed for cooling in the honing process and flushing away swarf and abrasion products from workpiece 5 and from the honing wheel. Any excess oil on a machined workpiece 5 can be blown off with compressed air while still within the (closed off by the workpiece spindle 4) settling tank 3. The interior of the honing machine 60, i.e. the interior of the machine housing 64 (outside the settling tank 3) remains virtually oil free. As a result, the interior of the machine housing 64 is basically not explosion-prone. However, an explosive oil-air mixture can still occur inside the settling tank 3 so that only the settling tank 3 needs to be equipped with an explosion relief device 70.

Although several embodiments have been described in detail for purposes of illustration, various modifications may be made to each without departing from the scope and spirit of the invention. Accordingly, the invention is not to be limited, except as by the appended claims.

What is claimed is:

1. A tool spindle for a honing machine, comprising:
   a bowl-shaped holder having a circumferential peripheral wall connected to a bottom part, where the bowl-shaped holder is configured to hold a honing ring on an inside of the bowl-shaped holder;
   at least one expansion element formed on the inside of the bowl-shaped holder along an inner surface of the circumferential peripheral wall, where the at least one expansion element radially clamps and centers the honing ring inside the bowl-shaped holder;
   a hydraulic chamber disposed in the bottom part of the bowl-shaped holder;
   at least one hydraulic line connecting in fluid communication the at least one expansion element and the hydraulic chamber; and
   a single adjustment element movable in relation to the bottom part of the bowl-shaped holder, where the single adjustment element is in fluid communication with the hydraulic chamber.

2. The tool spindle of claim 1, wherein the at least one expansion element comprises only one expansion element formed circumferentially 360 degrees around the inner surface of the circumferential peripheral wall.

3. The tool spindle of claim 1, wherein the at least one expansion element comprises at least two expansion elements oppositely disposed along the inner surface of the circumferential peripheral wall.

4. The tool spindle of claim 1, wherein the at least one hydraulic line comprises a plurality of hydraulic lines, where the plurality of hydraulic lines are connecting in fluid communication the hydraulic chamber and the at least one hydraulic expansion element.

5. The tool spindle of claim 1, wherein the single adjustment element comprises an adjusting screw.

6. The tool spindle of claim 5, wherein the adjusting screw screws into the bottom part of the bowl-shaped holder.

7. The tool spindle of claim 6, including a plunger coupled between the adjusting screw and the hydraulic chamber, where a fluid seal is formed between the bowl-shaped holder's bottom part and the plunger.

8. The tool spindle of claim 1, wherein the single adjustment element comprises a movable slider.

9. The tool spindle of claim 8, wherein the movable slider comprises a preload bias between the bowl-shaped holder's bottom part and the hydraulic chamber creating a pressure clamping and centering the honing ring in the bowl-shaped holder.

10. The tool spindle of claim 8, wherein the movable slider comprises a locking mechanism configured to lock the moveable slider in at least one position relative to the bottom part of the bowl-shaped holder.

11. The tool spindle of claim 1, wherein a motorized drive is mechanically coupled to the bowl-shaped holder.

12. The tool spindle of claim 1, wherein the bottom part of the bowl-shaped holder comprises a central shaft extending downward, and where the central shaft is mechanically coupled to a motorized drive.

13. The tool spindle of claim 1, including a settling tank enclosing the bowl-shaped holder.

14. The tool spindle of claim 13, wherein the settling tank comprises a removable cover.

15. The tool spindle of claim 14, wherein the removable cover comprises a screen moveable in relation to the cover, where the screen and the removable cover form a first oil-tight seal.

16. The tool spindle of claim 15, wherein the screen comprises an opening.

17. The tool spindle of claim 16, including a workpiece spindle comprising a spindle head, where the spindle head is configured to pass through the opening of the screen and form a second oil-tight seal.

18. The tool spindle of claim 17, where the screen is moveable relative to the cover when pushed by the workpiece spindle during a feed movement.

19. The tool spindle of claim 1, including at least one drainage channel extending through the bottom part from the inside of the bowl-shaped holder to an outside of the bowl-shaped holder.

20. A tool spindle for a honing machine, comprising:
a bowl-shaped holder having a circumferential peripheral wall connected to a bottom part, where the bowl-shaped holder is configured to hold a honing ring on an inside of the bowl-shaped holder, and where the bowl-shaped holder comprises a shaft extending from the bottom part;
an electric motor mechanically coupled to the shaft of the bowl-shaped holder, the electric motor configured to rotate the bowl-shaped holder about a vertical axis;
at least one expansion element disposed on the inside of the bowl-shaped holder along an inner surface of the circumferential peripheral wall, where the at least one expansion element radially clamps and centers the honing ring inside the bowl-shaped holder;
a hydraulic chamber disposed in the bottom part of the bowl-shaped holder;
at least one hydraulic line connecting in fluid communication the at least one expansion element and the hydraulic chamber;
a single adjustment element movable in relation to the bottom part of the bowl-shaped holder, where the single adjustment element is in fluid communication with the hydraulic chamber; and
at least one drainage channel extending through the bottom part from the inside of the bowl-shaped holder to an outside of the bowl-shaped holder.

* * * * *